United States Patent [19]

Esterowitz et al.

[11] 4,284,962
[45] Aug. 18, 1981

[54] EXCIMER-PUMPED FOUR LEVEL BLUE-GREEN SOLID STATE LASER

[75] Inventors: Leon Esterowitz, Springfield; Roger E. Allen, Alexandria, both of Va.; Melvin R. Kruer, Oxon Hill; Filbert J. Bartoli, Upper Marlboro, both of Md.

[73] Assignee: The United States of America as represented by the Secretary of the Navy, Washington, D.C.

[21] Appl. No.: 56,655

[22] Filed: Jul. 11, 1979

[51] Int. Cl.$^3$ ............................................... H01S 3/14
[52] U.S. Cl. .............................. 331/94.5 F; 331/94.5 P
[58] Field of Search ........................ 331/94.5 F, 94.5 E

[56] References Cited

U.S. PATENT DOCUMENTS

| | | | |
|---|---|---|---|
| 3,248,667 | 4/1966 | Johnson et al. | 331/94.5 F |
| 3,624,549 | 11/1971 | Geusic et al. | 331/94.5 H |

*Primary Examiner*—William L. Sikes
*Assistant Examiner*—Leon Scott, Jr.
*Attorney, Agent, or Firm*—R. S. Sciascia; William T. Ellis; Melvin L. Crane

[57] ABSTRACT

An efficient, four-level, blue-green, excimer-pumped laser which is operable at room temperature. The laser element includes a $CaWO_4$ crystal which has been codoped with trivalent thulium activator ions and divalent ytterbium sensitizer ions. Energy is transferred from the absorbing $Yb^{2+}$ ions to the $Tm^{3+}$ ions and the laser transition is from the $^1D_2$ multiplet to the ground $^3F_4$ of the $Tm^{3+}$ ion. This transition terminates on an excited state; therefore, the laser action is four-level.

5 Claims, 2 Drawing Figures

EXCIMER-PUMPED FOUR LEVEL BLUE-GREEN SOLID STATE LASER

BACKGROUND OF THE INVENTION

This invention relates to blue-green lasers and more particularly to an efficient four-level blue-green, excimer-pumped laser.

It is well known in the art that laser systems include three main components; the laser medium, which may be a gas or a solid; the laser cavity which includes reflective surfaces; and means for pumping the laser medium to an excited state. The laser medium may be optically pumped, or electronically or chemically excited and may be operated continuously or pulsed. Such laser systems may be operated at room temperature or at very low temperatures such as at liquid-nitrogen temperature. Further, laser systems may be operated in or outside the visible spectral region. They may be highpower or low power. Laser systems have been developed using a variety of elements, compounds, gases or fluids and all have one thing in common—they emit coherent radiation.

Laser emission in the blue-green spectral region has been reported in an article, "Stimulated Emission from $PrCl_3$", by K. R. German et al. in *Applied Physics Letters*, 22, page 87, 1973. The subject matter involved a tunable pulsed dye laser pumped by a nitrogen UV laser, and a crystal of $PrCl_3$ by which blue-green laser operation was achieved only when the crystal was cooled to below 14° K. More recently, an article, "Blue Light Emission by a $Pr:LiYF_4$—Laser Operated at Room Temperature", by L. Esterowitz et al. in *Journal of Applied Physics*, Vol. 48, No. 2, pp. 650–652, February 1977, described room-temperature operation of a blue-green laser where the laser medium was a $LiYF_4$ crystal doped with $Pr^{3+}$ and the excitation means was a flashlamp-pumped dye laser. It has been determined that dye lasers have poor operational life for the excitation wavelengths required and incoherent sources have poor efficiency. Patent application Ser. No. 868,360, filed 10 Jan. 1978, describes a blue-green laser pumped by a XeF excimer laser. The XeF laser pumps a matching transition in divalent ytterbium which has an absorption band between 350 and 360 nm depending on the host material. The host crystal such as $LiYF_4$ is codoped with $Yb^{2+}$ and $Pr^{3+}$ (the lasing ion). This laser system is a three-level laser which has better efficiency and operational life than prior-art dye pumped lasers.

SUMMARY OF THE INVENTION

This invention involves a solid-state laser system in which the laser medium is a crystal doped with rare earth ions which are pumped optically by means of a laser source. A XeF excimer laser operating at approximately 355 nm is used to longitudinally pump a $CaWO_4$ crystal which has been co-doped with divalent ytterbium sensitizer ions and with trivalent thulium activator ions. Energy is transferred from the absorbing $Yb^{2+}$ ions to the $Tm^{3+}$ ions. The laser transition is from the $^1D_2$ multiplet to the $^3F_4$ multiplet of the $Tm^{3+}$ ion. This transition terminates on an excited state; therefore, the laser action is four level.

DETAILED DESCRIPTION

A room-temperature four-level blue-green laser has been developed by co-doping a laser crystal of $CaWO_4$ with trivalent thulium activator ions and divalent ytterbium sensitizer ions. The optimum concentration of activator ions varies with that of the sensitizer $Yb^{2+}$. Since $Yb^{2+}$ has a large absorption cross-section, the sensitizer concentration may be two to three orders of magnitude lower than that of the activator ions.

A co-doped laser as set forth above may be made by any suitable crystal-growth method for which the trivalent activator ions and the divalent sensitizer ions may be uniformly dispersed throughout the calcium tungstate host lattice during the growth process. As an example, with a host material of $CaWO_4$ the concentration of trivalent rare-earth ions of Thulium ($Tm^{3+}$) necessary for laser action is in the range of about 0.5% to about 20% weight and the concentration of divalent ytterbium ions is from about 0.005% to about 0.20% by weight.

Growth of $CaWO_4$ crystals containing trivalent rare-earth activator ions and a low concentration of divalent ytterbium ions can be accomplished by the present art of crystal growing. In $CaWO_4$ the cations have a valence of two ($Ca^{2+}$) and six ($W^{6+}$). In order to incorporate a trivalent earth ion into a devalent site, compensation is necessary. This is achieved by replacing $Ca^{2+}$ with $Na^+$ or $W^{6+}$ with $Nb^{5+}$. (As set forth in a publication by H. H. Caspers and H. E. Rost, *J. Lumin.* 10, 347 (1975)). If the charge compensation is incomplete, some rare-earth ions in the crystal will be divalent, i.e., divalent ions occur naturally under these conditions. Therefore by doubly doping a $CaWO_4$ crystal with a rare-earth ion such as thulium together with ytterbium it is straight forward to obtain $Tm^{3+}$ ions together with a small concentration of $Yb^{2+}$ ions.

Figure 1:
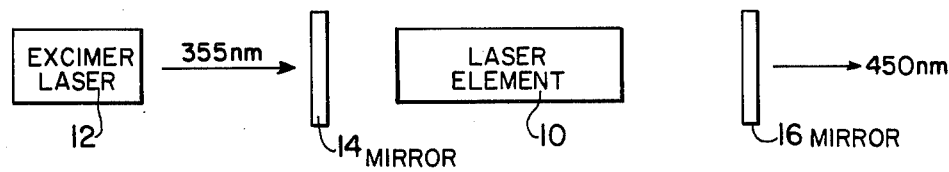
FIG. 1 illustrates a four-level glue-green laser system.

FIG. 1 illustrates an optical laser element 10 made in accordance with the above teaching. The laser element is longitudinally excited or pumped by a XeF excimer laser 12 operating at about 355 nm. The output of the excimer laser 12 is directed through a mirror 14 which passes radiation of 355 nm and is fully reflective at the operating wavelength (450 nm) of the laser element 10. A partially reflective mirror 16 completes the laser cavity with mirror 14 and passes the output wavelength of the laser element 10. The excitation laser and mirrors are aligned with the active laser element by methods well known in the art.

Figure 2:
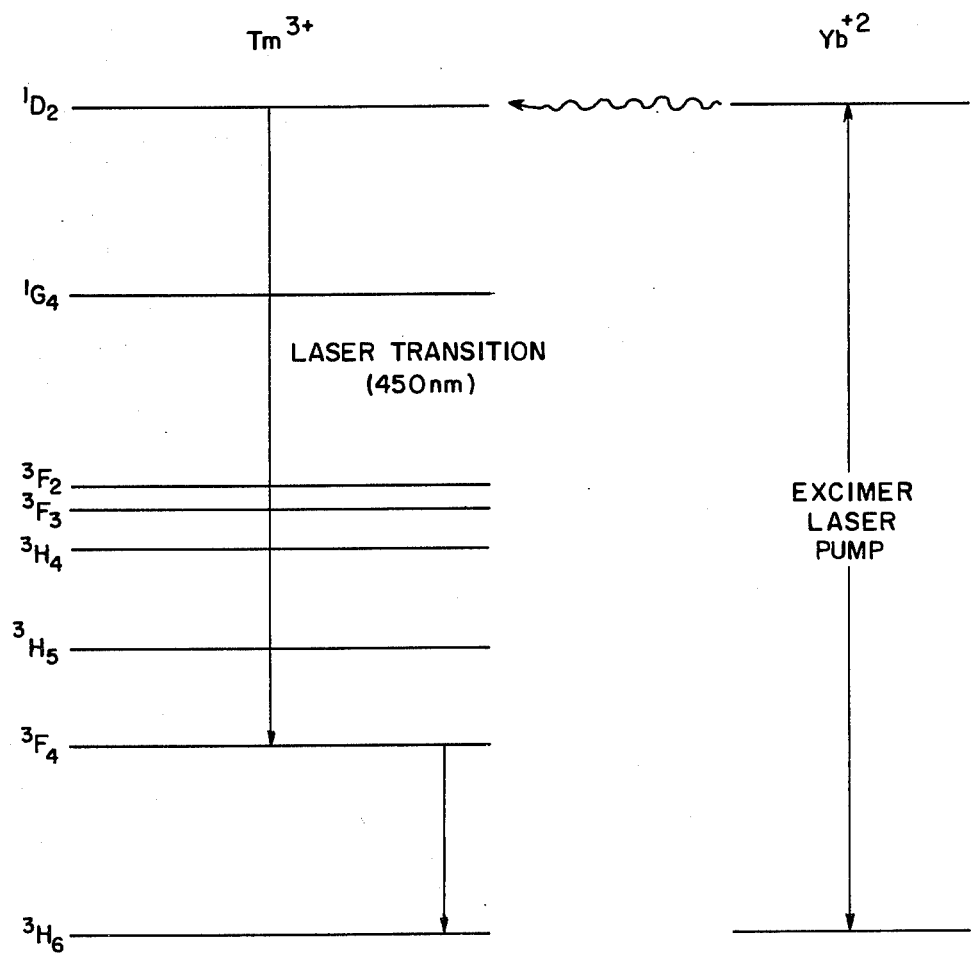
FIG. 2 illustrates a diagram of the "energy levels".

In operation, the XeF excimer laser longitudinally pumps the laser element 10. The divalent ytterbium sensitizer ions absorb the 355 nm radiation of the pump laser since $Yb^{2+}$ ions have an energy absorption level between 350 and 360 nm. Energy is transferred from the absorbing $Yb^{2+}$ to the $Tm^{3+}$ ions. The laser transition is from the $^1D_2$ multiplet to the $^3F_4$ multiplet of the $Tm^{3+}$ ion as shown by the energy level diagram of FIG. 2. Since this transition terminates on an excited state, the laser action is four-level with an output at 450 nm.

The preferred optical pumping is longitudinal as shown; however, transverse pumping may also be used, if desired.

A laser as described herein has an output in the blue spectral region. Since the laser has a blue region output, it has underwater applications. Four-level operation achieves low thresholds and high efficiencies.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A solid state laser element for four-level blue-green operation in a laser system and comprising:
    a host crystal of calcium tungstate;
    divalent sensitizer ions uniformly dispersed within said host crystal, wherein said divalent sensitizer ions are ytterbium and said divalent sensitizer ions of ytterbium have a concentration of from about 0.005% to about 0.20% by weight; and
    trivalent rare-earth activator ions uniformly dispersed within said host crystal.

2. A solid-state laser element as claimed in claim 1 wherein:
    said trivalent ions are thulium.

3. A solid-state laser element as claimed in claim 2 wherein:
    said trivalent rare-earth activator ions of thulium have a concentration of from about 0.5% to about 20% by weight.

4. A solid-state laser element for four-level blue-green operation in a laser system and comprising:
    a host crystal of calcium tungstate;
    divalent sensitizer ions uniformly dispersed within said host crystal; and
    trivalent rare-earth activator ions uniformly dispersed within said host crystal, wherein said trivalent rare-earth activator ions are thulium and said trivalent rare-earth activator ions of thulium have a concentration of from about 0.5% to about 20% by weight.

5. A solid-state laser element as claimed in claim 4 wherein:
    said divalent ions are ytterbium.

* * * * *